United States Patent [19]
Burns et al.

[11] Patent Number: 5,475,690
[45] Date of Patent: Dec. 12, 1995

[54] DELAY COMPENSATED SIGNAL PROPAGATION

[75] Inventors: Douglas J. Burns, Westford, Mass.; David M. Fenwick, Nashua, N.H.; Ricky C. Hetherington, Westboro, Mass.

[73] Assignee: Digital Equipment Corporation, Maynard, Mass.

[21] Appl. No.: 337,352

[22] Filed: Nov. 10, 1994

[51] Int. Cl.⁶ .................................................... H04J 3/06
[52] U.S. Cl. .................. 370/105.3; 370/108; 327/153; 327/271; 375/371; 395/550
[58] Field of Search .................. 370/108, 17, 100.1, 370/105.3, 14, 53, 84, 85.1, 112, 113; 375/371, 373, 376, 354, 355, 359; 455/67.1, 67.6; 395/550, 725, 775, 800, 250, 275, 425; 327/141, 144, 153, 161, 269, 270, 271; 365/49; 340/825.61

[56] References Cited

U.S. PATENT DOCUMENTS

| | | | |
|---|---|---|---|
| 4,055,851 | 10/1977 | Jenkins et al. | 395/425 |
| 4,151,593 | 4/1979 | Jenkins et al. | 395/425 |
| 4,897,783 | 1/1990 | Nay | 395/425 |
| 5,229,668 | 7/1993 | Hughes et al. | 327/271 |
| 5,325,508 | 6/1994 | Parks et al. | 395/425 |

*Primary Examiner*—Alpus Hsu
*Assistant Examiner*—Ricky Q. Ngo
*Attorney, Agent, or Firm*—Dirk Brinkman; Ronald Hudgens; Arthur Fisher

[57] ABSTRACT

In a computer system, digital signals are transmitted from an output register, propagated along a first signaling path, and received by an input register. The signaling path including an address buffer, a cache memory, a main memory, and an interconnect network. The effects of the intrinsic delays experienced by the digital signals are measured as a delay value relative to a reference clock signal propagated through a second signaling path duplicating the delays of the first signaling path. The delay value is used to selectively delay the digital signal to maintain a fixed relationship between the transmitted and received digital signals. Delay measuring and regulation is provided by driving the reference and digital signals through comparable tapped delay lines, the output taps of a measuring delay line controlling the output taps of a delaying line. Storage latches are provide to hold the measured delay value stable between successive samples.

7 Claims, 9 Drawing Sheets

DELAY COMPENSATED SIGNAL PROPAGATION

FIELD OF THE INVENTION

This invention relates generally to transmitting and receiving digital signals, and more particularly to compensating for propagation delays of the digital signals in computer systems.

BACKGROUND OF THE INVENTION

In a synchronous computer system, digital signals are transmitted from output registers through logic elements and wires, and received by input registers. The rate at which the digital signals can be transmitted and received is controlled by a system clock which generates clock signals having a fixed relationship with respect to the digital signals. The performance of the computer system has a direct correlation to the maximum rate at which the digital signals are transmitted and received as controlled by the system clock.

For the proper operation of the computer system, the system clock should guarantee that the digital signals are held stable in the output registers to meet the required setup and hold times of the input registers. The important features of the signaling path which determine a maximum possible clock rate (Cmax) are: a maximum time (Tmax) required to propagate the digital signals through the signaling path; a minimum time (Tmin) required to propagate the digital signals through the path; the input register setup time (Tsetup); and the input register hold time (Thold). Taking these features into consideration, the maximum possible clock rate can be determined by:

$$Cmax=Tmax+Tsetup+Thold-Tmin \qquad [1]$$

This formulation suggests that the clock rate can be maximized by minimizing the time required to propagate the digital signals through the signaling path or by reducing variations between the minimum and maximum delays encountered along the signaling path. In known technologies, the maximum time required to propagate the digital signals along the signaling path can only be minimized by reducing the size, expressed in terms of physical length of the signaling path, or the complexity of the logic elements along the signaling path. In most cases, reducing the maximum propagation delays below design limitations has proven to be physically impossible. This leaves the reduction in variations between the minimum and maximum delays .as the principle means to achieve a maximum possible clock rate to improve the overall performance of the computer system.

Variations between the minimum and maximum propagation delays are primarily due to a number of, sometimes uncontrollable, contributing factors. Wire lengths, clock skew, fabrication processes, environmental conditions, such as temperature and voltage, can all induce variable propagation delays. Currently, reduction in delay variations is achieved by forcing the electrical lengths of the signaling paths to be equivalent. Equal lengths of the signaling paths can also reduce variations due to fluctuations in temperature and voltage.

Further reduction in the delay variations is usually achieved by "binning." In binning, the components used to construct the signaling path are carefully tested and selected to more stringent timing requirements than the design requirements. This results in increased system costs due to the additional testing and selection. Binning also decreases component yield because the more stringent timing requirements select fewer components.

Therefore, it is desired that process, environmental, and load induced variations of signaling propagation delays be reduced to increase the rate at which digital signals can be transmitted and received along signaling paths. In addition, the decrease of these variations should be attained without substantially increasing the cost of the computer system.

SUMMARY OF THE INVENTION

The present invention resides in a method and apparatus for compensating for the effects of intrinsic and variable propagation delays experienced by digital signals of a computer system to increase the signaling rate of the digital signals. The digital signals are transmitted from an output register, propagated along a first signaling path, and received by an input register. The signaling path can include, for example, an address buffer, cache memory, a main memory, and an interconnect network. In order to maintain a fixed-time relationship between the transmitted and received digital signals, a system clock signal is used to control the rate at which the signals are transmitted and received. However, the effects of intrinsic delays can detrimentally skew the relationship between the transmitted and received digital signals.

In accordance with the invention, the effects of the intrinsic delays experienced by the digital signals are measured by driving a reference clock signal through a second signaling path, the second signaling path substantially duplicating the intrinsic operational delays of the first signaling path. A delay value is expressed as a difference between a maximum possible delay and the measured delay. The maximum possible delay can be predetermined from design and fabrication criteria. The delay value is used to delay the transmitted digital signal to maintain the fixed-time relationship between the transmitted and received the digital signals.

Delay measuring is provided by driving the reference clock signal through the duplicating circuits of the second signaling path, and a tapped measuring delay line. As the digital signal is driven through the address buffer and a comparable tapped delaying line, the output taps of the measuring delay line control the output taps of the delaying line. Storage latches are provide to hold the measured delay value stable between successive samples. As an advantage, the invention permits real-time adjustment of signaling skew induced by process and environment. Furthermore, the adjustments can be made with a high degree of resolution over a wide range of delays. And, the amount of reduction in skew can exceed that possible through a "binning" strategy.

DETAILED DESCRIPTION OF ILLUSTRATIVE EMBODIMENTS

Figure 1:
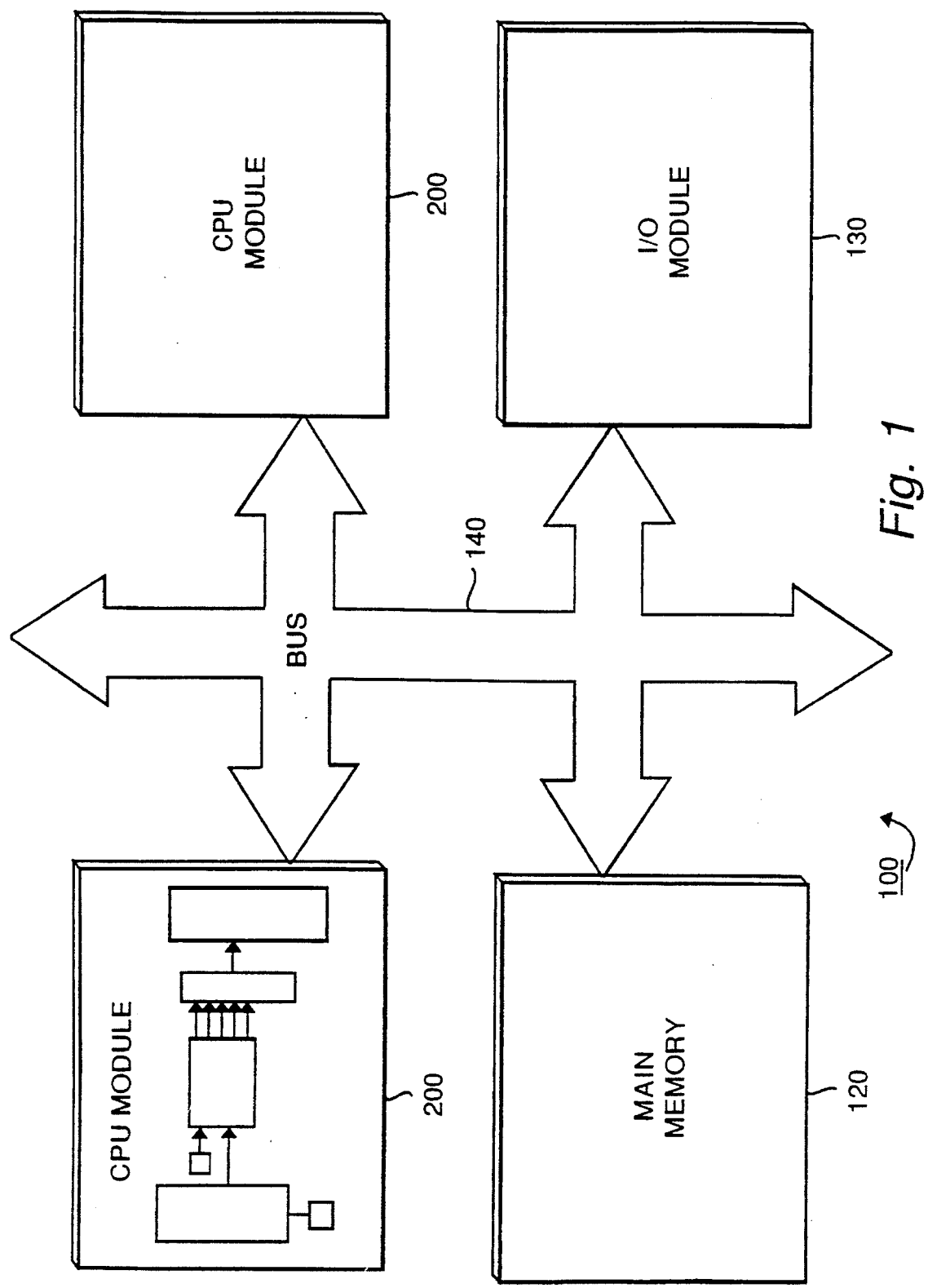
FIG. 1 is a block diagram of a computer system incorporating delay compensated signal propagation in accordance with the invention.

Referring to FIG. 1, a synchronous computer system 100 typically includes one or more central processor unit (CPU) modules 200, a main memory 120, and an input/output (I/O) module 130 connected to each other by a synchronous communications bus 140. During operation of the computer 100, data are communicated from the main memory 120 and the I/0 module 130 to the CPU modules 200 via the bus 140. The data are processed by the CPU module 200 using instructions which are part of the data which are communicated. After processing, the data can be transferred back to the main memory 120 and the I/O modules 130 for persistent storage.

Figure 2:
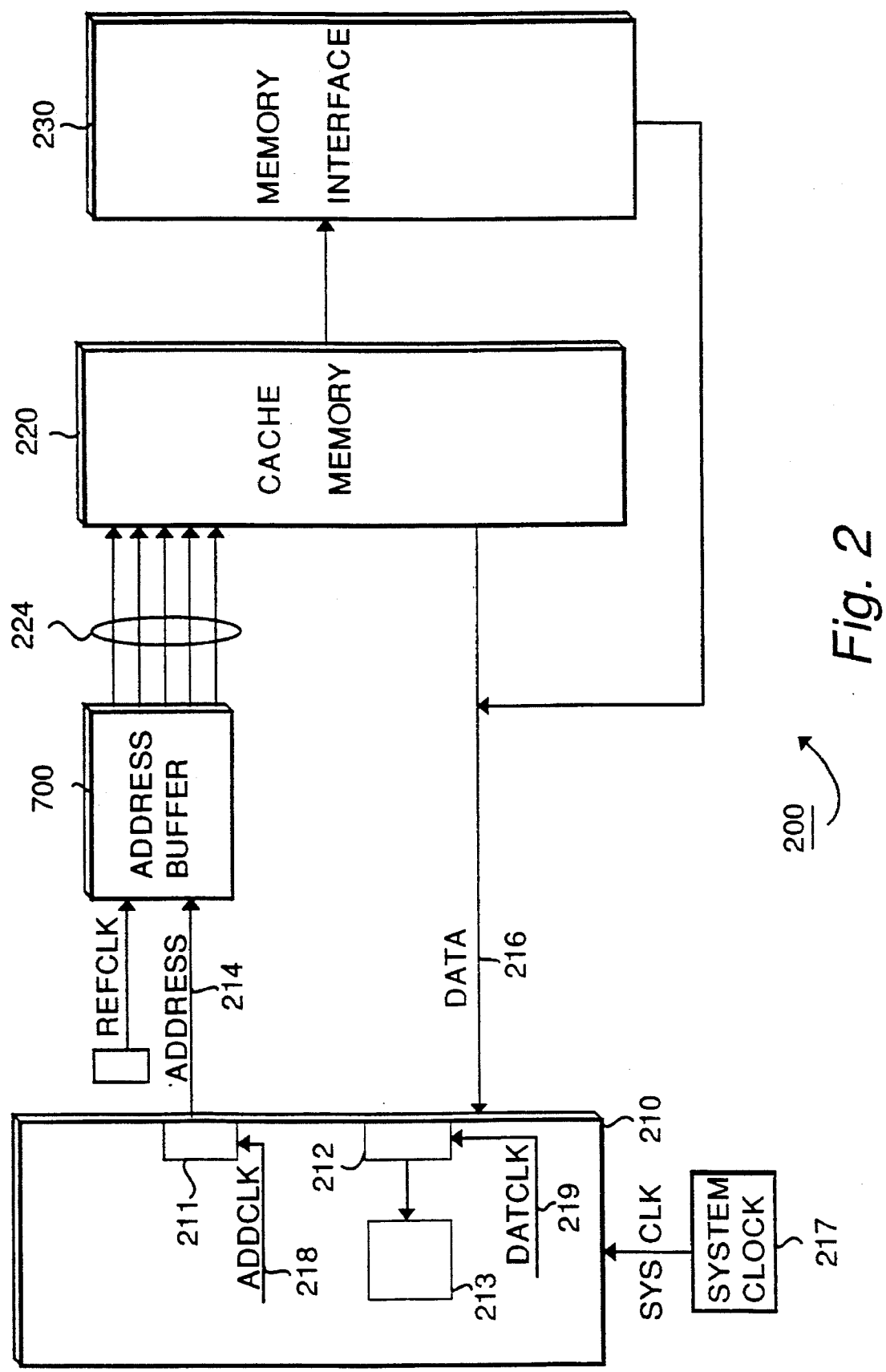
FIG. 2 is a block diagram of a central processing unit module.

FIG. 2 shows the elements of the CPU module 200 in greater detail. The CPU module 200 includes a central processing unit (CPU) 210, a cache memory 220, and a memory interface 230. The CPU 210 can include an output register 211 and an input register 212 for transmitting and receiving digital signals representing addresses and data, respectively. The CPU 210 processes data received from the main memory 120. The data are stored in the main memory 120 at the specified addresses. The rate at which the digital signals are transmitted and received are controlled by a system clock 217 generating system clock signals (SYSCLK) having a fixed timing relationship with respect to the transmitted and received digital signals.

In order to take advantage of spatial and temporal localities of data processed by the CPU 210, the cache memory 220 can be used to store frequently used data of the main memory 120. The CPU 210 can also include on-chip data and instruction caches 213 to further improve memory-to-CPU data transfer rate.

During operation of the CPU module 200, a memory address of requested data is stored in the output register 211. The output register 211 provides a means for holding the digital signals representing the memory address (ADDRESS) stable until the digital signals representing the data (DATA) at the memory address are received by the input register 212. The output register 211 is coupled to an address buffer 700 by address wires 214. The address buffer 700 provides "fan-out" of the memory address signals. Fan-out of the address signals may be required where the physical organization of the cache memory 220 demands multiple address wires 224, and where the CPU 210 does not have sufficient power to transmit the digital signals to the cache memory 220 over the multiple address wires 224.

If the requested data are stored in the cache memory 220, the data are received by the input register 212 via cache interconnect wires 216. Otherwise, the cache memory 220 makes a request for the desired data to the main memory 120 via the memory interface 230 and the bus 140. While the data are supplied to the cache memory 220 by the main memory 120, the data can also be received by the input register 212 of the CPU 210. Typically, the amount of data transferred between various levels of memory hierarchy, the main memory 120, the cache memory 220 and the CPU caches 213 is expressed in quantities known as "lines." Acquiring a line requires a successive transmittal of the address signals to gather all the data of the line.

Associated with the wires and logic components placed in the signaling path are variable signaling propagation delays. For example, the address buffer 700 can include transistors configured as inverters and buffer circuits. An inverter "inverts" the logical sense of the digital signals and is merely used for signal amplification. That is, the address buffer 700 does not produce any particular logic function since the binary values of the address signal at the input 214 to the address buffer 700 are identical to the binary values of the address signal at the output 224 of the address buffer 700.

However, buffering of low-drive strength digital signals, for example, the address signals produced by the CPU 210 to produce high-drive strength digital signals to drive the cache memory 220, is very susceptible to variations in propagation delays due to uncontrollable variabilities in fabrication processes and environmental conditions. Therefore, the length of time that the digital signals are held stable in the input and output registers by the clock timing signals on wires 218 and 219, to compensate for signaling skew in delaying components, such as the address buffer 700, are a critical factor in determining the performance of the computer 100.

An analysis of the timing diagrams of the digital and clock signals will be used to introduce the principles of the invention. These diagrams may also be used to understand the following description of exemplary embodiments of circuits implementing the invention in the computer system 100.

Figure 3:
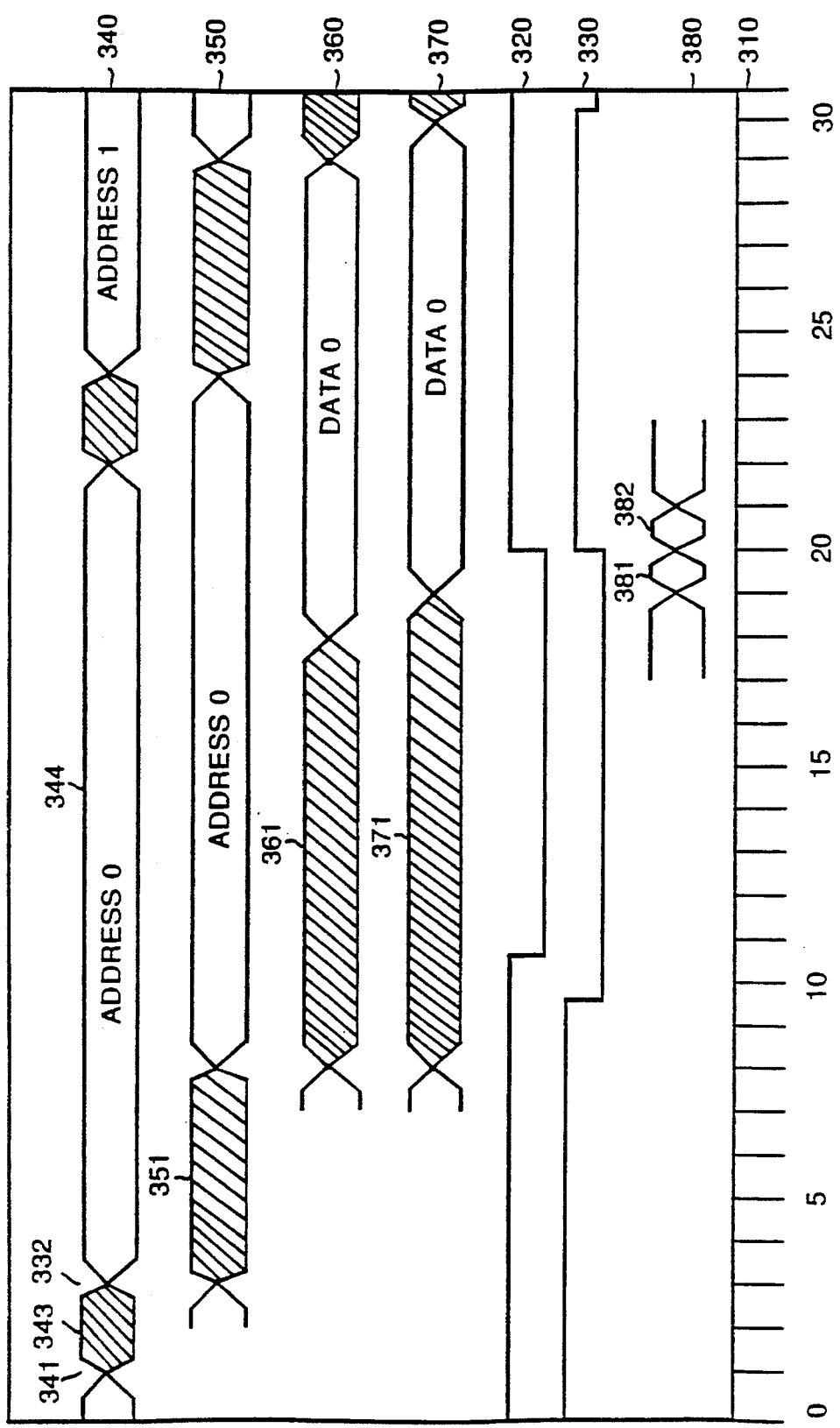
FIGS. 3–6 are timing diagrams showing signal propagation delays in signaling paths of the computer of FIG. 1.

FIG. 3 shows the minimum and maximum delays which can be experienced by the digital signals as they are propagated from the output register to the input register of FIG. 2. In FIG. 3, the scale 310 is arbitrarily marked in nanoseconds. The lines 320 and 330, respectively, represent the address clock signal and the data clock signal. The address clock signal (ADDCLK) 320 is used to control the output register 211 via wire 218, see for example FIG. 2, and likewise, the data clock signal 330 (DATCLK), via wire 219 controls the input register. The clock signals maintain a fixed relationship between the transmitted address signals and the received data signals. The address and data clock signals are derived, for example, from the system clock 217.

Although the analysis of the variations in propagation delays of the digital signals are shown with respect to clock signal having a specific periodicities and exemplary delays, it should be apparent to those skilled in the art that the analysis holds equally true for other clock frequencies and other variations in delays.

Signaling lines 340 show the minimum delay, e.g. 341, and maximum delay, e.g., 342, before the address signal appears on wire 214 of FIG. 2. For example, after the onset of the address clock signal 320 at time 0, the address signal can be present at the input to the address buffer 700 via wire 214, at a minimum, as soon as 1 nanosecond later, and, at a maximum as late as 3 nanoseconds. The shaded window 343 represents this variation in delay. The unshaded portion 344 of line 340 represents the length of time while the address signal is known to be stable in the output register 211.

The lines 350 show the minimum and maximum delays which can be experienced by the address signals in the address buffer. This variation in delay is indicated by shaded portion 351 of lines 350. The variations in access latencies of the cache memory 220 are shown by the shaded portion 361 of data signal lines 360. And, finally, the variations due to delays in the cache interconnect, e.g., wires 216, are shown by the shaded portion 371 of the timing line 370. The lines 380 show, respectively, the setup time window 381 and the hold time window 382 required by the input register 212 to successfully capture the data signals.

Therefore, the maximum clock rate (Cmax) at which address signals can be successively transmitted from the output register 211 can be expressed as:

$$Cmax = max(Toutput) + max(Tbuf) + max(Tcache) + max(Twire) + max(Tsetup) + max(Thold) \quad [2]$$

where:

Touput=propagation delay (343) of the output register;
Tbuf=propagation delay (351) of the address buffer;
Tcache=access latency(361) of the cache memory;
Twire=propagation delay (371) of cache interconnect;
Tsetup=setup time (381)requirements of the input register; and
Thold=hold time (382) requirements of the input register.

For the exemplary propagation delays shown in FIG. 3, the maximum clock rate is every 21 nanoseconds.

This rate can be increased by a technique known as wave-pipelining. In wave-pipelining, a next successive address signal is presented to the output register 211 before the data associated with the previous address signal are received by the input register 212. This overlapping of address and data signal signals can result in increased system performance without the need for a faster cache memory. The amount of overlap that can be achieved is directly related to the variations in propagation delays experienced along the signaling path.

Figure 4:
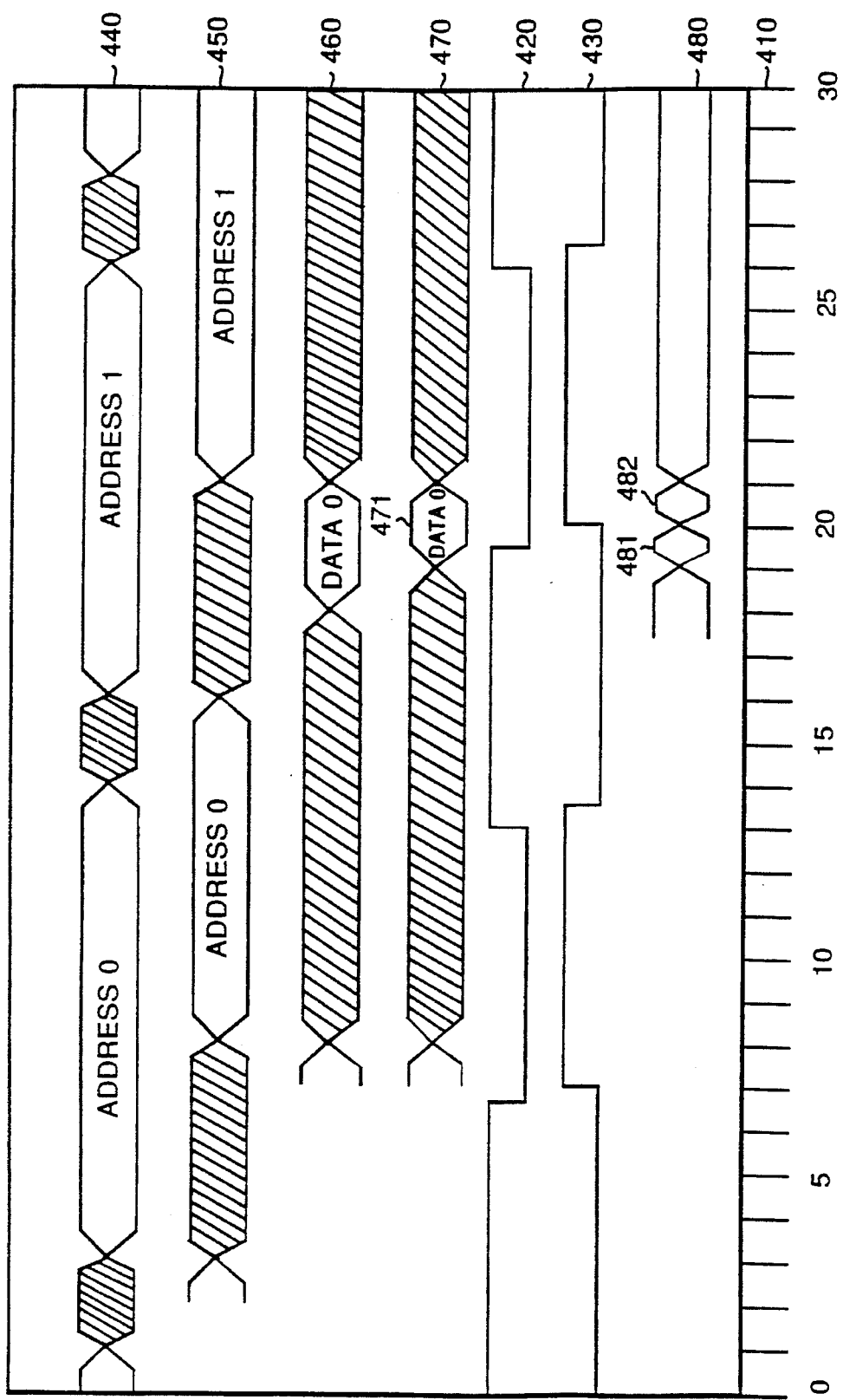

To understand wave-pipelining, consider the example timing diagram shown in FIG. 4. In FIG. 4, the scale 4 10 is marked in nanoseconds. The lines 420 and 430 respectively represent the address clock signals and the data clock signals. Lines 440, 450, 460, and 470 show the propagation delays in the output register, the address buffer, the cache memory, and the cache interconnect, respectively.

Although the various propagation delays shown in FIG. 4 are the same as in FIG. 3, the next address signal, e.g., ADDRESS 1 on line 440, is presented to the output register 211 before the dam, e.g., DATA 0, associated with the previous address signal, e.g., ADDRESS 0, are received by the input register 112. The overlap of the transmitted address signal and the received data signal can be extended as long as the window of time 471 that the data signal is stable in the input register 212 meets the setup and hold time requirements 481 and 482, e.g., 2 nanoseconds.

Therefore, the maximum clock rate (Cmax) at which the address signal can be transmitted from the output register 211 using wave-pipelining techniques can be expressed as:

$$Cmax = max(Toutput) + max(Tbuf) + max(Tcache) + max(Twire) + max(Tsetup) + max(Thold) - min(Toutput) - min(Tbuf) - min(Tcache) - min(Twire) \quad [3]$$

For the exemplary propagation delays shown in FIG. 4, with wave pipelining, the maximum possible clock rate is every 13 nanoseconds.

The amount time of the overlap of the address and data signals (Toverlap) can be expressed as:

$$T(overlap) = Touput(min) + Tbuf(min) + Tcache(min) + Twire(min) \quad [4]$$

In order to increase the amount of overlap, conventional designs have minimized the amount of variation between the maximum and minimum propagation delays, e.g. minimizing (max-min) variations, by forcing all wires to be of the same length and by carefully selecting components by binning, as explained above. Thus, minimizing of (max-min) is accomplished by maximizing the minimum delays.

However, instead of selecting components to produce less variations, a better alternative is proposed for minimizing variations in propagation delays. In accordance with the invention, the circuits and components themselves measure variations in propagation delays and adjust the delays to minimize the variations.

For example, if it is determined that a particular component propagates digital signals faster that others, delay is injected to slow the component down. If the component is slow, but within specification, no delay needs to be injected. By selectively injecting variable delays, the variation between the maximum and minimum propagation delays can be made to approach zero. Since only faster components are affected, the size of the hold window of the data signals is accordingly increased.

Figure 5:
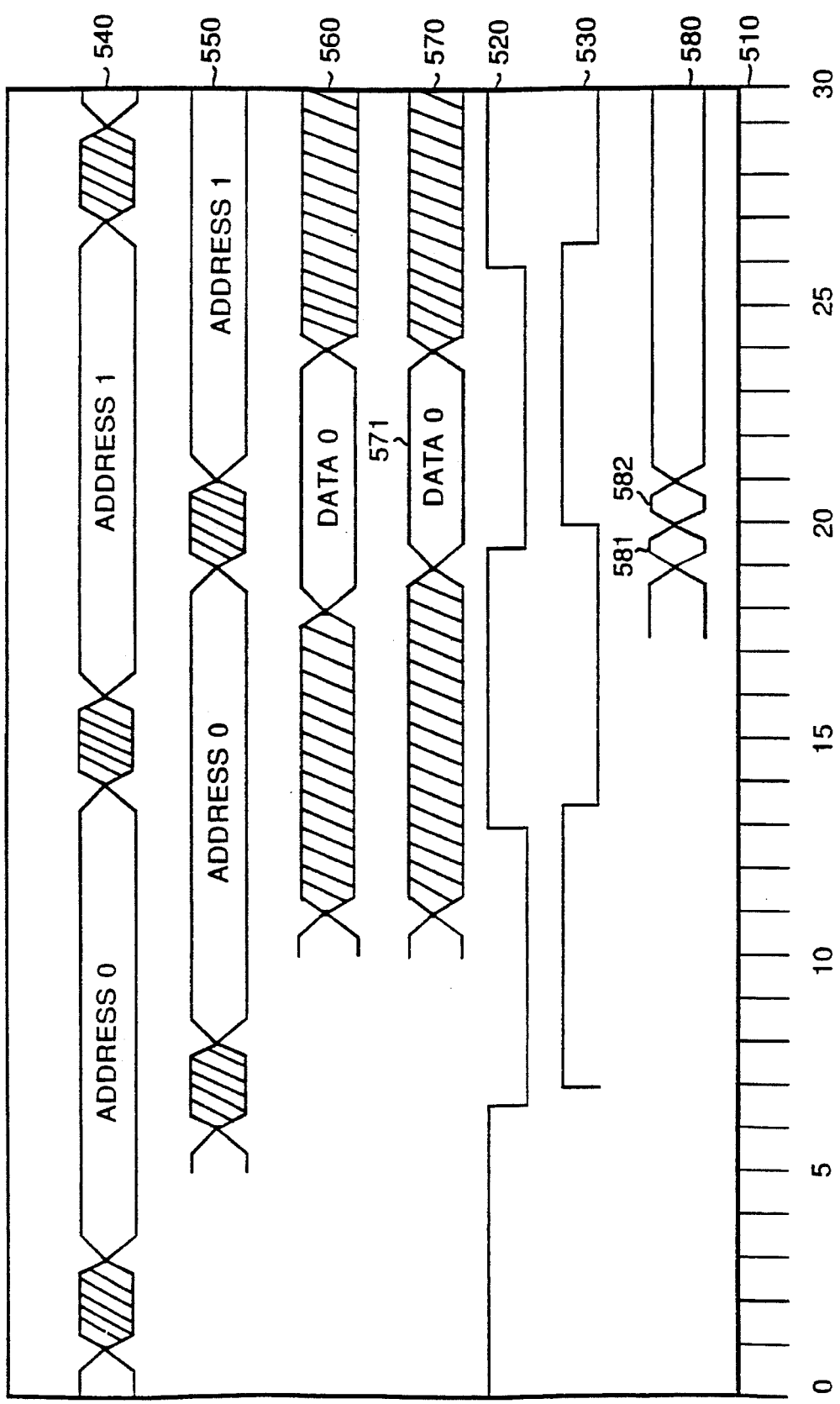

FIG. 5 shows the resultant gain in the size of the hold window. In FIG. 5, the scale 510 is marked in nanoseconds. The lines 520 and 530 respectively represent the address clock signals and the data clock signals. Lines 540, 550, 560, and 570 show the propagation delays in the output register, the address buffer, the cache memory, and the cache interconnect, respectively. Compare, for example, lines 450 of FIG. 4, and lines 550 of FIG. 5. The variation between the minimum and maximum delay of signal propagation through the address buffer 700 has been reduced from 3 nanoseconds to 0 nanoseconds, with the maximum and minimum "compensated" delay now being 5 nanoseconds. Thus, the uncertainty windows of line 550 are the same as those of line 540, only delayed by the 5 nanosecond intrinsic delay of the address buffer 700.

This decrease in variation is achieved, as explained in further detail below, by increasing the minimum delay. The 3 nanosecond reduction is reflected in the increased size of the hold window 571, which is now 5 nanoseconds, instead of 2 nanoseconds of the comparable hold window 471, as shown in FIG. 4. The increase in size of the hold window 571 is of no performance value. However, allowing an earlier transmittal of the next address signal will yield an earlier reception of the corresponding data signal.

Thus, counter-intuitively, slowing digital signals down, according to the invention, actually makes the computer system run faster.

Figure 6:
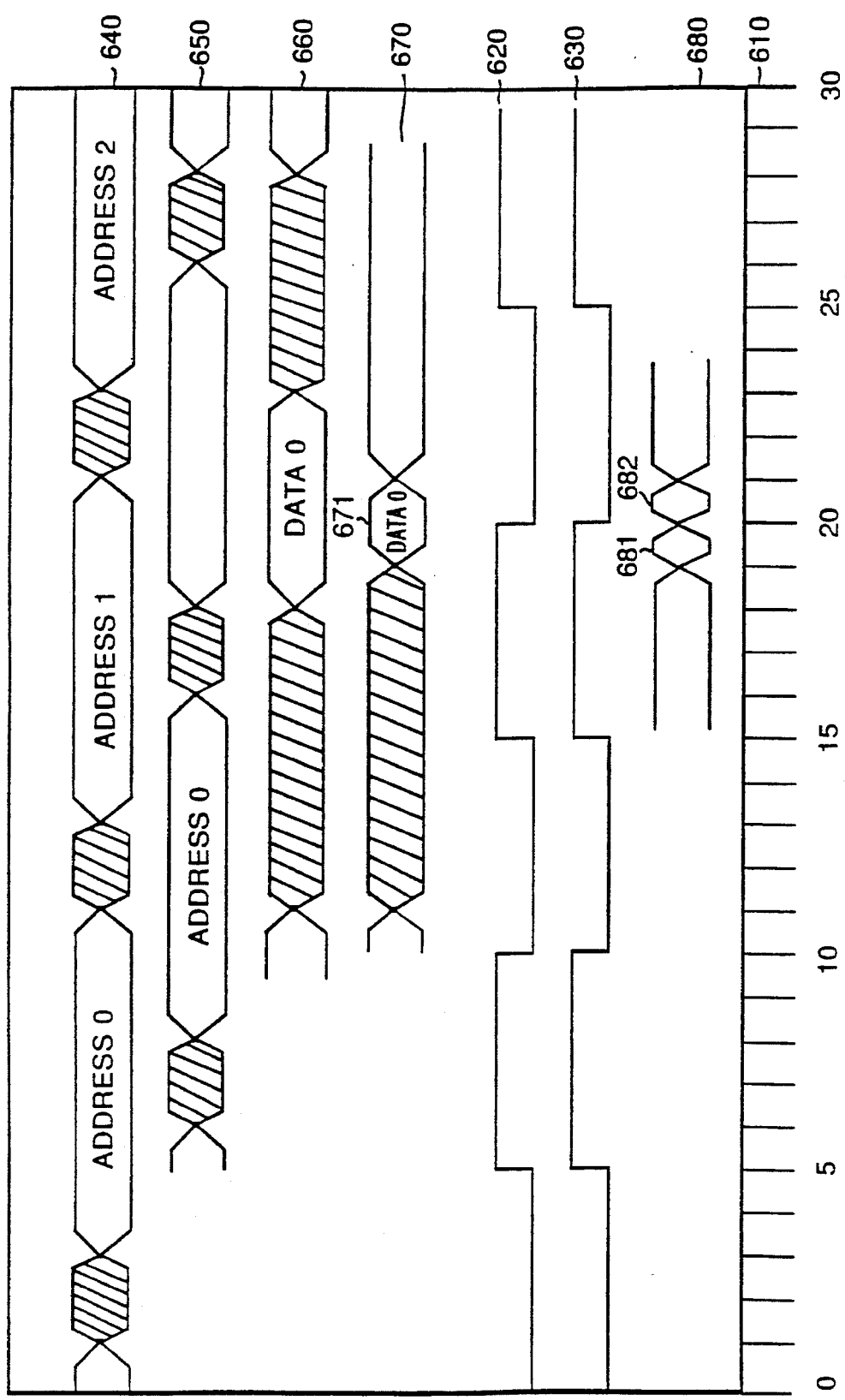

The effects of delay compensated signal propagation are clearly shown in FIG. 6. In FIG. 6, the scale 610 is again marked in nanoseconds. The lines 620 and 630 respectively represent the address clock signals and the data clock signals. Lines 640, 650, 660, and 670 show the propagation delays in the output register, the address buffer, the cache memory, and the cache interconnect, respectively.

However, as shown in FIG. 6, the increased size of the data hold window 671, e.g. 3 nanoseconds, is consumed by increasing the address and data clock rates. For example, the address signals are transmitted every 10 nanoseconds, and the corresponding data signals are also received every 10 nanoseconds, thereby increasing the memory-to-cpu throughput, significantly improving the overall performance of the computer system 100.

Figure 7:
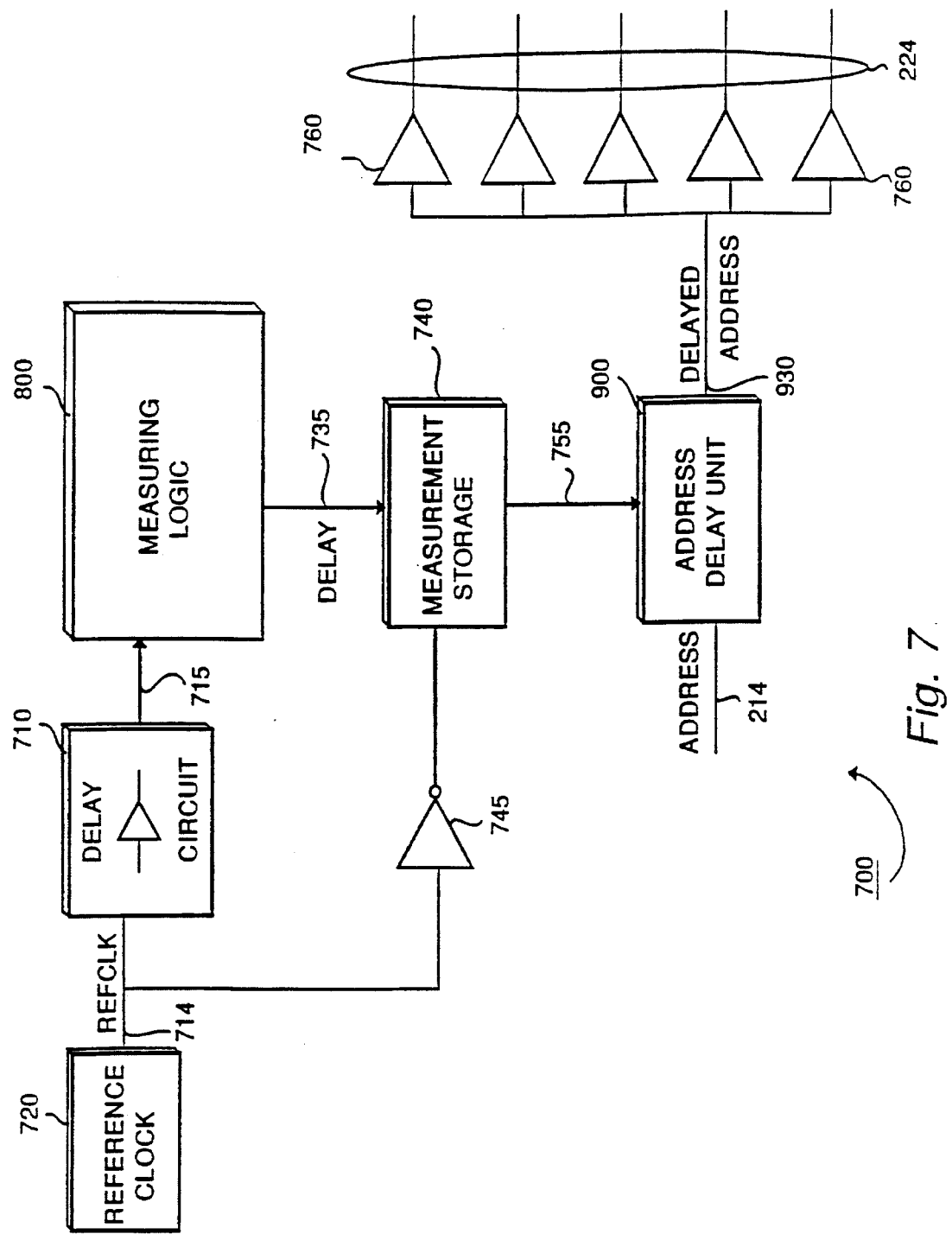
FIG. 7 is a block diagram of an address buffer according to a preferred embodiment of the invention.

FIG. 7 shows an exemplary embodiment of the invention applied to the address buffer 700 of FIG. 2. The address buffer 700 includes a delay circuit coupled to a reference clock 720 by wire 714. The delay circuit 710 is coupled to a measuring logic 800 by wire 715. An output of the measuring logic 800, a delay value (DELAY), is connected to a measurement store 740 via line 735. The measurement store 740 is also connected to the reference clock 720 via an inverter 745. The output of the measurement store 740 is connected to an address delay unit 900 by wire 755. The address delay unit 900 also receives the address signal via wire 214. After an appropriate delay, a delayed address signal on wire 930 is distributed, via signal drivers 760, to the cache memory 220 of FIG. 2 via wires 224.

The reference clock 720 produces a reference clock signal (REFCLK) which has a rate substantially similar to the maximum propagation delay experienced by the address signals propagating through the address buffer 700, for example, as shown in FIGS. 3 and 4, five nanoseconds. The delay circuit 710 mimics, in real-time, the delays experienced by the address signals along the path from wire 214 to wires 224. For example, the delay circuit is an operative duplicate circuit of the address buffer itself. Thus, the reference clock signal driven through the delay circuit 710 is delayed a substantially identical amount of time as the address signals, even as temperature and voltage fluctuate, regardless of fabrication processes used to make the components.

A portion of the reference clock signal, however, is not thus delayed since it by-passes the delay circuit 710. Thus, the measuring logic 800 determines, in real time, the delay value of the difference between maximum delay time and the current delay time of the address buffer 700.

The delay value can be stored in the measurement storage 740, and subsequently be used to control the address delay unit 900. For example, no delay is applied to the address signal if the measured delay in the delay circuit 800 is the maximum delay possible, e.g. 5 nanoseconds. However, should cooler temperature and higher voltages make the components of the address buffer 700 run faster, the address signal is delayed accordingly to hold the delays experienced by successively propagated address signals substantially constant. Then, the rate at which the successive address signals are transmitted can be increased by increasing the clock rate m deliver data to CPU more frequently, without redesigning the cache and main memory components.

Figure 8:
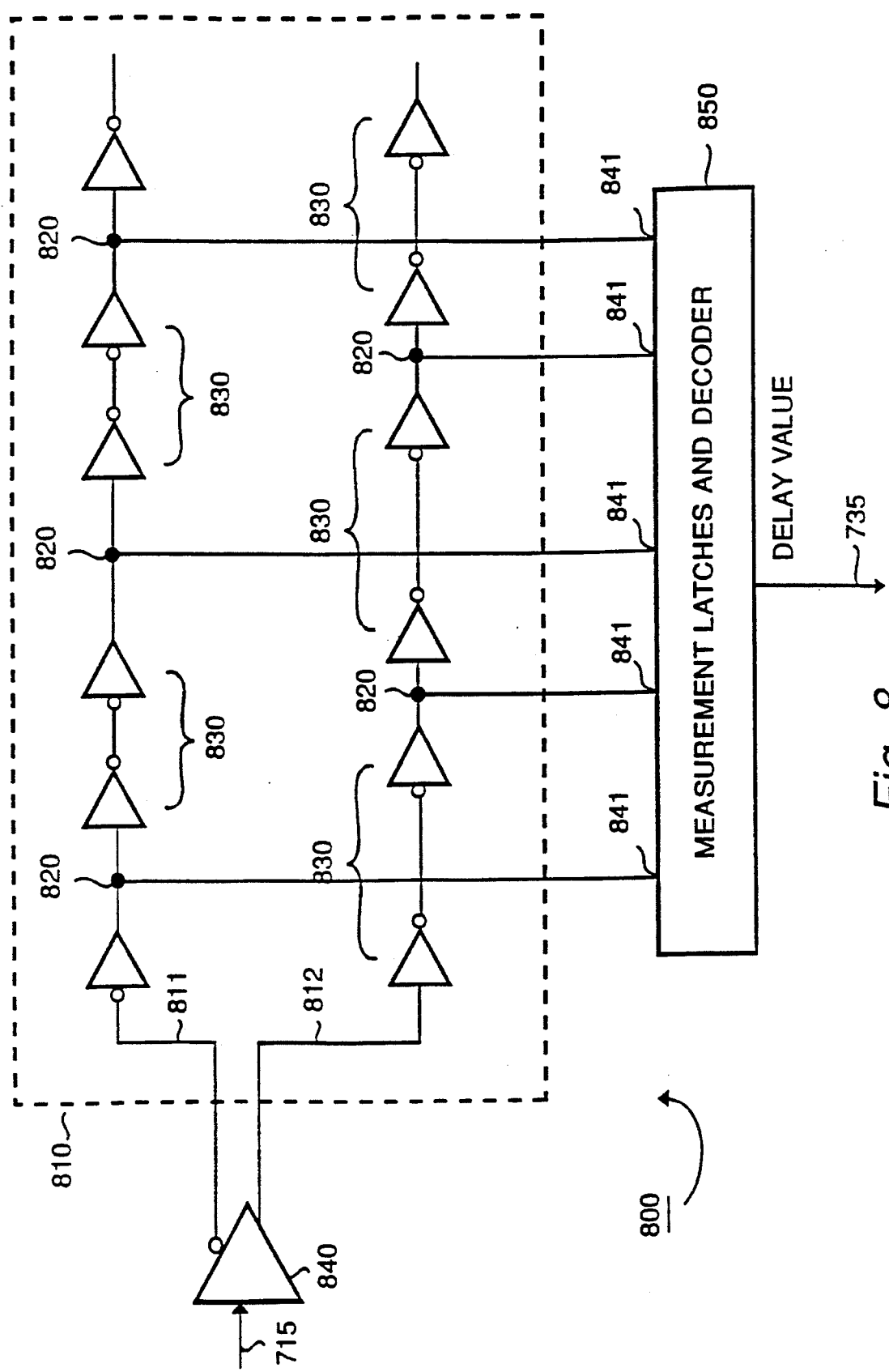
FIG. 8 is a circuit diagram of a measurement logic of FIG. 7.

FIG. 8 shows a preferred embodiment of the measuring logic 800. The logic 800 includes a tapped delay line 810, a measurement latches and decoder 850, and a balancing circuit 840. The delay line 800 includes two strings 811–812 of cascading inverters. The string 811 and 812 of cascading invertors have taps 820 placed at the outputs of alternating inverter-pairs 830. This arrangement generates a digital signal at each of the taps 820. The tapped digital signal reflects the propagation delay value in terms of unity time intervals, while maintaining a correct polarity of the digital signals. Each of the taps 820 is connected to a respective input 841 of the measurement latches and decoder 850.

Specifically, during operation of the address buffer 700, the signals at the taps 820 define time values which can be used to compensate for propagation delay anomalies. Because the taps 820 on the strings 811 and 812 are alternated at the input of the inverters 830, granularity is increased to yield a higher degree of delay value resolution. The strings 811 and 812 are driven by the balancing circuit 840 that splits the reference clock signal into two logically opposing signals having substantially no skew, each opposing signal is provided to one of the inverter string 811 and 812. Thus, the delay line 810 has single inverter granularity with alternating taps 820, but no phase reversal, e.g., no inversion. The delay is sensed by, for example, a Johnson counter-style decoder circuit, not shown. The decoded signals are then stored in the measurement storage 740 via wires 735.

Figure 9:
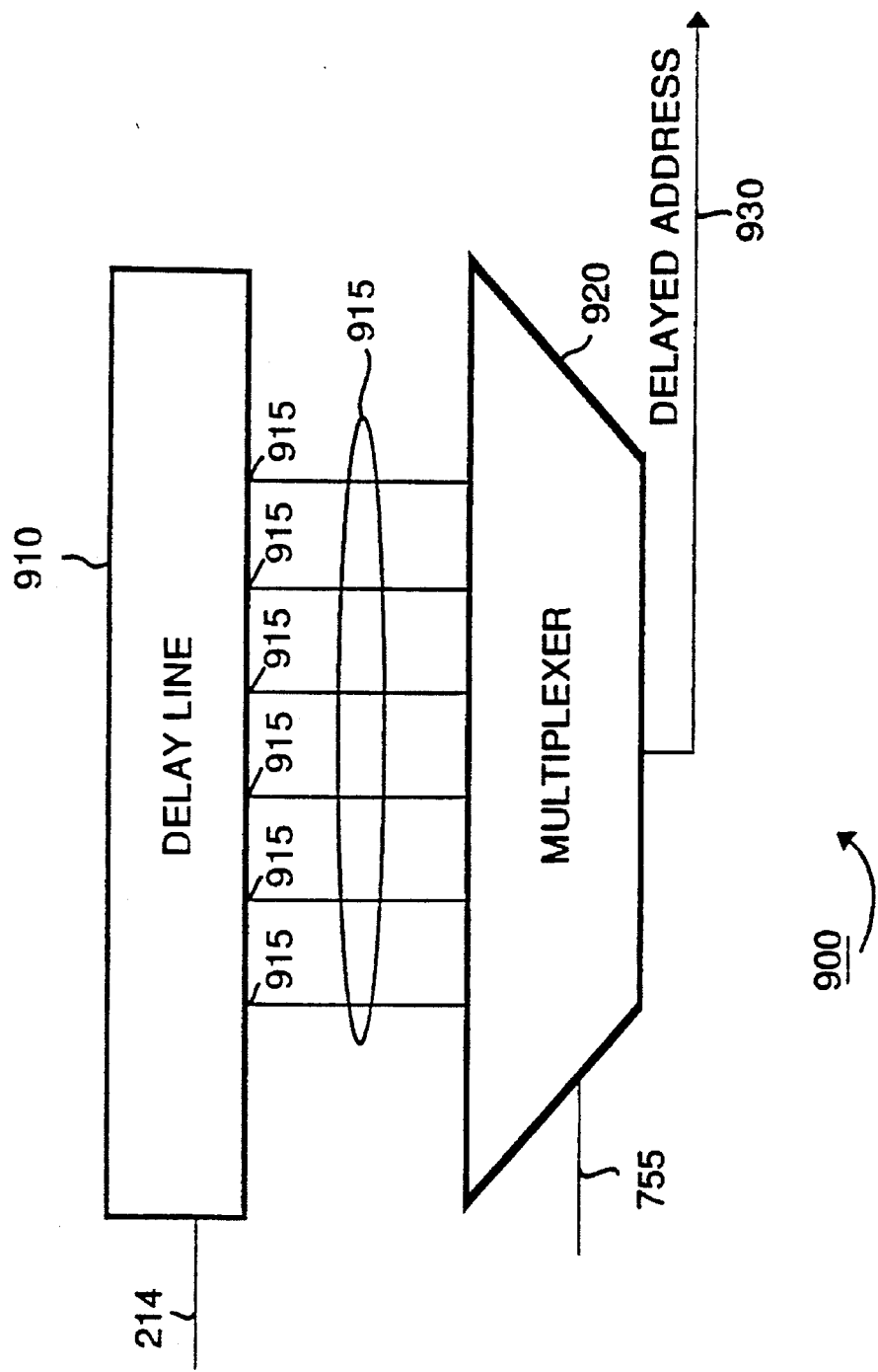
FIG. 9 is a block diagram of a address delay unit of the circuit of FIG. 7.

A preferred embodiment of the address delay unit 900 is shown in FIG. 9. The address delay unit 900 includes a delay line 910 connected to a multiplexer 920. The delay line 910 receives the address signal via wire 214. The delay value stored in the measurement storage 740 is used to select an appropriate tap 915 on the delay line 910 by the multiplexer 920. The delay line 910, like the delay line 810, preferably comprise two strings of cascaded inverters, with a corresponding number of taps 915 located at the outputs of alternating inverter pairs. The selection of a specific one of the taps 915 delays the address signal on line 930 the desired amount to minimize variations.

The reduction in variations of propagation delays can be absorbed in a higher signalling rate for the computer system 100.

Disclosed are illustrative embodiments of the invention described using specific terms and examples. It is to be understood that various other adaptations and modifications may be made within the spirit and scope of the invention. For example, the invention is equally applicable to digital signals successively driven through other logic circuits subject to uncontrollable delays in signal propagation. Therefore, it is the object of the appended claims to cover such all such variations and modifications as come within the true spirit and scope of the invention.

We claim:

1. An apparatus for controlling propagation of digital signals in a computer system, comprising:

means for transmitting digital signals;

means, connected to the means for transmitting, for propagating the digital signals, the means for propagating the digital signals delaying the digital signals an intrinsic amount of time, the intrinsic amount of time being uncontrollable over time;

means for receiving the digital signals from the means for propagating;

means for generating a first clock signal to maintain a fixed-time relationship between when the digital signals are transmitted and received;

means for generating a second clock signal;

means for propagating the second clock signal, the means for propagating the second clock signal delaying the second clock signal an equivalent intrinsic amount of time as the digital signals are delayed;

means for measuring the equivalent intrinsic amount of time the second clock signal is delayed;

means for determining a delay time, the delay time being a difference between a predetermined maximum amount of time the digital signals are delayed by the means for propagating the digital signals and the equivalent intrinsic amount of time the second clock signal is delayed; and means for delaying the digital signals by the delay time to reduce variations between the fixed-time relationship when the digital signals are transmitted and received, wherein the first clock rate is to be increased without overlapping successively received digital signals.

2. The apparatus as in claim 1 wherein the means for propagating the second clock signal includes a delay circuit, the operation of the delay circuit being substantially equivalent to the operation of the means for propagating the digital signals.

3. The apparatus as in claim 2 wherein the means for propagating the digital signals includes an address buffer connected to the means for transmitting and a cache memory of the computer system.

4. The apparatus as in claim 1 wherein the means for propagating the second clock signal includes a first delay line measuring the delay of the second clock signal, and a second delay line delaying the digital signals.

5. The apparatus as in claim 4 further including a latch having inputs connected to the first delay line, the latch storing the delay time, and a multiplexer connected to the latch and the second delay line, the multiplexer receiving the delay time.

6. An apparatus for controlling propagation of digital signals in a computer system, comprising:

means for propagating a digital signal, the means for propagating having an intrinsic delay uncontrollable over time;

means for measuring a difference in time of a predetermined maximum delay and the intrinsic delay experienced by the digital signal while the digital signal is propagated by the means for propagating at a particular time; and means for delaying the digital signal by the difference in time to increase a rate at which the digital signal can be propagated a first clock, connected to the means for propagating, the first clock determining the rate at which the digital signal can be propagated;

a reference clock, connected to the means for measuring, the reference clock generating a reference signal;

a first delay line substantially duplicating the operation of the means for propagating, the first delay line propagating the reference signal while the digital signal is propagated;

a latch coupled to the first delay line for storing a value representative of the difference of a predetermined maximum delay and the intrinsic delay experienced by the digital signal while the digital signal is propagated at a particular time; and a multiplexer connected to the latch and a second delay line for delaying the digital signal by the difference.

7. In a computer system, an apparatus for controlling propagation of digital signals, the computer system including a central processing unit, and a memory, comprising:

an address buffer transmitting address signals from the central processor to the memory, the address buffer delaying the address signals while transmitting;

means for maintaining a fixed rate at which the address signals are transmitted;

means for determining a delay time, the delay time being a difference between a predetermined maximum time the address buffer can delay the address signals and a measured amount of time the address signals are delayed by the address buffer; and means for delaying the address signals by the delay time to increase the fixed rate at which the address signals are transmitted.

* * * * *